United States Patent [19]

Hartman et al.

[11] Patent Number: 5,336,733
[45] Date of Patent: Aug. 9, 1994

[54] HIGH PERFORMANCE POLYURETHANE BASE RESINS

[75] Inventors: Terrence L. Hartman, Franklin Park; Charles A. Cody, Robbinsville, both of N.J.

[73] Assignee: Rheox, Inc., Hightstown, N.J.

[21] Appl. No.: 111,431

[22] Filed: Aug. 25, 1993

Related U.S. Application Data

[63] Continuation of Ser. No. 697,016, May 8, 1991, abandoned, which is a continuation-in-part of Ser. No. 336,001, Apr. 10, 1989, abandoned.

[51] Int. Cl.$^5$ .................. C08L 67/02; C08L 67/04; C08L 75/06
[52] U.S. Cl. .................. 525/411; 525/413; 525/415; 528/80
[58] Field of Search .................. 525/411, 413, 415; 528/80

[56] References Cited

U.S. PATENT DOCUMENTS

| | | | |
|---|---|---|---|
| 4,415,728 | 11/1983 | Tremblay | 525/440 |
| 4,430,131 | 2/1984 | Tremblay | 525/440 |
| 4,814,413 | 3/1989 | Thibaut et al. | 528/80 |
| 4,996,283 | 2/1991 | Greco et al. | 528/80 |

OTHER PUBLICATIONS

Magnus, G. "Poly-E-Caprolactone Based Urethanes". Rubber Age, Jul., 1965. pp. 86-93.
"Niax Caprolactone Polyols For Moisture-Cure Urethane Coatings". Product Data Sheet, Union Carbide. Oct., 1967.
"Improved Polyurethane Elastomers". Rubber Age, Mar., 1967 pp. 78-81.

*Primary Examiner*—James J. Seidleck
*Assistant Examiner*—Thomas Hamilton, III
*Attorney, Agent, or Firm*—Michael J. Cronin

[57] ABSTRACT

Disclosed are polyurethane base resins, and polyurethane composites and adhesive compositions formed using the base resins. The polyurethane base resins are formed by reacting a polycarbodiimide-modified 4, 4'-diphenylmethane diisocyanate with a mixture of the following polyols: (a) a hydroxyl-terminated, linear, saturated liquid copolyester diol having a glass transition temperature of at most −10° C. and at least −60° C.; and (b) a homopolyester polyol that is a ring-opened polymer of a cyclic ester. The polyurethane composites include typical active hydrogen-containing species that will react with isocyanates and promote curing, in addition to the polyurethane base resin. The polyurethane adhesive compositions, which are thermosetting, include the cured polyurethane base resin, cured by exposure to moisture or any other applicable curing mechanism. The adhesive compositions have improved performance (e.g., tensile strength and adhesion) at elevated service temperatures, and are suitable for high performance automotive structural bonding applications.

9 Claims, No Drawings

HIGH PERFORMANCE POLYURETHANE BASE RESINS

This is a continuation of application Ser. No. 07/697,016, filed May 8, 1991, now abandoned, which is a continuation in part of Ser. No. 07/336,001, filed Apr. 10, 1989, now abandoned.

FIELD OF THE INVENTION

The present invention is directed to a polyurethane base resin, a polyurethane composite including such base resin (e.g., a thermosetting polyurethane composite), and a polyurethane composition (e.g., a thermosetting composition, such as a thermosetting adhesive composition) formed by curing such polyurethane base resin, as well as processes for producing such base resin and such composite and composition. More specifically, the present invention is directed to polyurethane base resins, and thermosetting polyurethane composites containing such base resins and thermosetting polyurethane adhesive compositions formed by curing such base resins, wherein the composition has improved performance characteristics at elevated temperatures, and processes of producing the same.

BACKGROUND OF THE INVENTION

U.S. patent application Ser. No. 336,001, filed Apr. 10, 1989, discloses, among other things, polyurethane structural adhesive compositions, and polyurethane base resins used in forming such compositions. This U.S. patent application Ser. No. 336,001 discloses that the polyurethane base resins are prepared by reacting a stoichiometric excess of polyisocyanate compound with at least one polyol compound. The stoichiometric excess of polyisocyanate compound produces isocyanate terminals on the reaction product that can be reacted further with species containing at least two active hydrogen atoms, such as primary and secondary polyamines, water, polyalcohols, polyacids and polymercaptans, resulting in curing.

Various exemplary suitable polyisocyanate compounds useful for preparing the polyurethane base resin are disclosed in U.S. patent application Ser. No. 336,001, such compounds generally being disclosed as including aromatic, aliphatic, cycloaliphatic and aralkyl polyisocyanate compounds containing from about 6 to about 100 carbon atoms. A number of specific polyisocyanate compounds are disclosed, and it is disclosed that 4,4'-diphenylmethane diisocyanate (MDI) is preferred for preparing the polyurethane base resin.

This U.S. patent application Ser. No. 336,001 also discloses various polyols suitable for use in preparing the polyurethane base resin; e.g., U.S. patent application Ser. No. 336,001 discloses that saturated copolyester diols are most preferred because by using combinations of various types of such diols the final adhesive properties can be adjusted to achieve desired properties. U.S. patent application Ser. No. 336,001 also discloses that ring-opened polymers of cyclic esters, such as polycaprolactone, can also be used; and that the so-called polymer polyol compositions such as polyether polyols and/or polyester polyols, and also polyols which can be attained by polymerizing ethylenically unsaturated compounds in a polyether or polyester polyol, are suitable.

There is also disclosed in U.S. patent application Ser. No. 336,001 a type of polyurethane base resin most preferred for use for producing thermosetting polyurethane structural adhesive compositions disclosed in U.S. patent application Ser. No. 336,001. U.S. patent application Ser. No. 336,001 also discloses that this most preferred polyurethane base resin may be used, without modification, as a reactive adhesive composition that is cured by atmospheric moisture. U.S. patent application Ser. No. 336,001 further discloses that this most preferred polyurethane base resin is prepared by reacting a stoichiometric excess of a polyisocyanate with a combination of three different types of hydroxyl-terminated, linear, saturated copolyesters each having a molecular weight between 1000 and 6000 g/mol.

While application Ser. No. 336,001 discloses polyurethane base resins, and thermosetting polyurethane composites and thermosetting polyurethane adhesive compositions utilizing such polyurethane base resins, having improved performance characteristics over previously known materials, it is still desired to provide polyurethane base resins, and composites and compositions formed utilizing such polyurethane base resins (for example, thermosetting polyurethane adhesive compositions formed utilizing (e.g., formed by curing) such polyurethane base resins), having enhanced performance characteristics, particularly when subjected to elevated service temperatures (in particular, it is desired to provide thermosetting polyurethane adhesive compositions having enhanced performance, including improved tensile strength and adhesion at elevated temperatures).

More generally, it is desired to provide isocyanate-functional materials that are liquids or thermoplastic solids, but that are ultimately thermosetting by reaction with any typical active hydrogen-containing species that will react with isocyanates and promote curing (e.g., atmospheric moisture, or in situ water generating agents, or amine-functional solid polyamide resins), to provide a cured product having superior performance (e.g., as an adhesive) at elevated service temperatures.

SUMMARY OF THE INVENTION

It is an object of the present invention to provide polyurethane compositions (in particular, thermosetting polyurethane adhesive compositions) having improved performance characteristics at elevated service temperatures, and to provide polyurethane base resins and polyurethane composites (e.g., thermosetting polyurethane composites) used to form such polyurethane compositions, and to provide methods of forming such base resins, such composites and such compositions.

It is a further object of the present invention to provide polyurethane base resins, which can be used to provide polyurethane adhesive compositions having improved performance (e.g., improved tensile strength and adhesion) at elevated service temperatures, and which are liquids or thermoplastic solids but which are ultimately thermosetting (e.g., by reaction with active hydrogen-containing species that will react with isocyanates and promote curing).

It is a still further object of the present invention to provide such polyurethane compositions (e.g., thermosetting polyurethane structural adhesive compositions) and such polyurethane base resins and polyurethane composites utilized for forming such compositions, suitable for high performance automotive structural bonding applications, as well as for other bonding applications in the automotive, aerospace, electronics, marine and furniture assembly industries.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

In the following description, where it is described that the composition or other material "includes" or "comprises" various components, it is also contemplated as part of the present invention that the composition or other material "consists essentially of", or "consists of", the specified components.

To achieve the objects and in accordance with the purpose of the invention, as embodied and broadly described herein, the invention provides a polyurethane base resin prepared by reacting a polyisocyanate including polycarbodiimide-modified 4, 4'-diphenylmethane diisocyanate (that is, polycarbodiimide-modified MDI) with polyols including a combination of two types of polyols as follows:

I. (Type 2) at least one hydroxyl-terminated, linear, saturated liquid copolyester having a glass transition temperature of at most about $-10°$ C. and at least about $-60°$ C. ($-10°$ C. $\geq Tg \geq -60°$ C.), and having from about 40% to about 100% aliphatic character; and II. (Type 4) homopolyester polyols that are at least one ring-opened polymer of a cyclic ester, such as polycaprolactone.

As described in U.S. patent application Ser. No. 336,001, which also utilizes the Type 2 copolyester in its disclosed most preferred polyurethane base resin, the Type 2 copolyester imparts increased open time, adhesion and elasticity, and decreased flow point, cohesion and hardness, to the polyurethane base resin. The ring-opened polymers, examples of which are the Tone 0200 series polyols from Union Carbide Chemical and Plastics Co., Inc., are homopolyester polyols which provide properties of improved adhesion with good green strength, ease processing and better hydrolytic stability, to name a few in improved properties.

An illustrative (and non-limiting) example of polycarbodiimide-modified MDI useful for the present invention is an isocyanate that is approximately 70–80% "pure" MDI, with 20–30% being in the form of a trifunctional (with respect to available isocyanate groups per molecule) carbodiimide-containing adduct of MDI.

Use of the polycarbodiimide-modified MDI provides improved results, as seen in the following. Upon heating to temperatures of about 90° C. or greater, adduct dissociation takes place to generate an additional isocyanate group and provide low viscosities. Upon cooling, the adduct reforms, thereby increasing crosslink density. The carbodiimide linkage also provides an improved hydrolytic stability.

As can be seen in the foregoing, according to the present invention a specific diisocyanate is used in forming the polyurethane base resin. Moreover, as an additional aspect of the present invention, a specific combination of polyols is utilized in forming the polyurethane base resin. Furthermore, by using both the specific diisocyanate and the specific combination of polyols, various advantages in the formed polyurethane base resin can be achieved.

The polyurethane base resin of the present invention can be admixed with any typical active hydrogen-containing species that will react with isocyanates and promote curing, in order to form a thermosetting polyurethane composite according to the present invention. Various active hydrogen-containing species that can be utilized, as part of the composite of the present invention, as a curing agent, are disclosed in U.S. patent application Ser. No. 336,001, filed Apr. 10, 1989, the contents of which have previously been incorporated herein by reference in their entirety. Illustratively, and not limiting, the active hydrogen-containing species that reacts with isocyanates and promotes curing can be an in-situ water-generating agent, or an amine-functional solid polyamide resin (for example, an amine-terminated solid polyamide resin). As disclosed in U.S. patent application Ser. No. 336,001, such polyamide resin can be formed into a powder and dispersed into a polyurethane base resin. Specific polyamide resins are disclosed in U.S. patent application Ser. No. 336,001.

The polyurethane base resin of the present invention can also be cured by moisture, in order to form thermosetting polyurethane adhesive compositions according to the present invention.

The polyurethane base resin, thermosetting polyurethane composite and thermosetting polyurethane adhesive composition according to the present invention each can be formed utilizing the processing steps (and processing parameters) disclosed respectively for forming the polyurethane base resins, the thermosetting polyurethane composite and the thermosetting polyurethane structural adhesive composition in U.S. patent application Ser. No. 336,001, filed Apr. 10, 1989, the contents of which have previously been incorporated herein by reference in their entirety. Reference is made to such application U.S. patent application Ser. No. 336,001 for the specific techniques disclosed therein for forming the respective base resins, composite and composition according to the present invention.

Moreover, the method of using the polyurethane base resins, the thermosetting polyurethane composites and the thermosetting polyurethane adhesive compositions according to the present invention utilizes the same processing steps (and processing parameters) as described in U.S. patent application Ser. No. 336,001, filed Apr. 10, 1989, the contents of which have previously been incorporated herein by reference in their entirety, and reference is made to the specific methods of use described therein.

The invention provided herein provides a departure from preferred materials described in U.S. patent application Ser. No. 336,001, filed Apr. 10, 1989. Thus, preferred materials in U.S. patent application Ser. No. 336,001 are based on a mixture of three different saturated copolyester diols which varied in degree of crystallinity, aromatic versus aliphatic character and glass transition temperature. These three saturated copolyester diols are capped with 4, 4'- diphenylmethane diisocyanate (MDI), the resulting polyurethane base resin being a mixture of isocyanate-functional polyester-urethanes which is a thermoplastic solid prior to curing. The three saturated copolyester diols of the preferred polyurethane base resins in U.S. patent application Ser. No. 336,001 are as follows:

I. (Type 1) a solid, amorphous saturated copolyester diol having a glass transition temperature greater than 0° C., with 80–100% aromatic character;

II. (Type 2) a liquid, saturated copolyester diol having a glass transition temperature of at most $-10°$ C. and at the least $-60°$ C., with 40–100% aliphatic character; and III. (Type 3) a solid, partially crystalline copolyester diol having a glass transition temperature less than 0° C., with 40 to 100% aliphatic character.

Comparing this preferred material from U.S. patient application Ser. No. 336,001 with the polyurethane base resins according to the present invention, it can be seen that there have been two classes of changes therebetween. The first is in the backbone: rather than the Types 1, 2 and 3 saturated copolyester diols of U.S. patent application Ser. No. 336,001, the present invention has Types 2 and 4, as discussed previously. The second class of changes is in the isocyanate that is employed. Rather than using "pure" MDI, as in U.S. patent application Ser. No. 336,001, the present invention utilizes a polycarbodiimide-modified MDI.

Due to these two classes of changes, a greatly enhanced performance at elevated service temperatures has been achieved. In particular, due to such enhanced performance the polyurethane materials according to the present invention are suitable for high performance automotive structural bonding applications, in addition to other applications.

Accordingly, the present invention achieves the objectives discussed above, providing isocyanate-functional materials that are liquids or thermoplastic solids and which are ultimately thermosetting, having enhanced performance at elevated service temperatures after curing by atmospheric moisture or any other applicable curing mechanism.

DESCRIPTION OF THE PREFERRED EMBODIMENTS

While the invention will be described in connection with specific and preferred embodiments, it will be understood that it is not intended to limit the invention to those embodiments- To the contrary, it is intended to cover all alterations, modifications and equivalents as may be included within the spirit and scope of the invention as defined by the appended claims.

The present invention contemplates a polyurethane base resin formed by reacting polycarbodiimide-modified MDI with a combination of two types of polyols, as follows:

I. (Type 2) a liquid saturated copolyester diol, having a glass transition temperature of at least −60° C. and of at most −10° C., with 40-100% aliphatic character; and II. (Type 4), a homopolyester polyol that is a ring-opened polymer of a cyclic ester. Illustrative of the Type 4 polyol is polycaprolactone. The present invention also contemplates thermosetting polyurethane composites containing such polyurethane base resin and a curing agent therefor (e.g., a material containing active hydrogen that will react with isocyanates and promote curing); compositions (e.g., thermosetting polyurethane adhesive compositions) formed from such base resins; and methods of forming such base resins, such composites and such compositions.

The present invention, utilizing (in addition to the Type 2 diol) the above-described Type 4 polyol, and also utilizing polycarbodiimide-modified MDI, enables preparation of polyurethane base resins and compounded reactive hot melt adhesives with greatly improved properties. Certain properties, such as tensile strength and bond strength at room temperature or at elevated temperature, can be further improved via increased urethane content.

Typical equivalent ratios of the reactants used in forming the polyurethane base resins according to the present invention are as shown in the following Table 1:

TABLE 1

|  | Range | Preferred | Most Preferred |
|---|---|---|---|
| Polycarbodiimide-modified MDI | 4–16 | 8–12 | 10 |
| Type 2 polyester diol | 0–8* | 2–6 | 4 |
| Type 4 polyester polyol | 0–4* | 1–3 | 2 |

*Excluding the zero end points

As disclosed previously, the materials of the present invention are formed utilizing polycarbodiimide-modified MDI. An illustrative (and non-limiting) polycarbodiimide-modified MDI is "Isonate 143L" modified MDI (a product of The Dow Chemical Co.). This "Isonate 143L" modified MDI is a liquid at room temperature, and has a low viscosity and good storage stability down to 75° F. Typical properties of "Isonate143L" are shown in the following Table 2.

TABLE 2

| Properties | Typical Value |
|---|---|
| Isocyanate equivalent weight | 144.5 |
| NCO content by weight, % | 29.2 |
| Hydrolyzable chloride, ppm | 30 |
| Acidity, @ % as HCl | 0.002 |
| Viscosity, cps @ 25° C. | 33 |
| Density, g/ml @ 25° C. | 1.214 |
| Vapor pressure, mm Hg @ 25° C. | $<10^{-5}$ |
| Extrapolated boiling point, °C. | 314 |
| Appx. decomposition point °C. | 230 |
| Flash point, °F., ASTM D 93 Closed Cup | >351 |
| Specific heat, gm · cal/gm · °C. | 0.43 |
| Thermal conductivity, gm · cal/cm · sec · °C. | 0.0003 |
| Coefficient of thermal expansion, kg/l/1° C. | 0.0009 |
| Heat of vaporization, cal/gm | 86 |
| Viscosity growth, cps/mo. @ 25° C. | 2–5 |

The "Isonate 143L" Modified MDI has the following chemical formula:

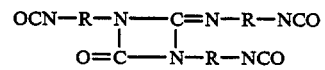

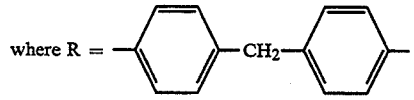

As indicated previously, the modified diisocyanate utilized according to the present invention can include 70–80% (in %w/w) of MDI (as defined herein), with 20 to 30% being in the form of a tri-functional (with respect to available isocyanate groups per molecule) carbodiimide-containing adduct of MDI. Upon heating to temperatures of about 90° C. or greater, adduct dissociation takes place to generate an additional isocyanate group as shown in the following, providing further benefits mentioned previously.

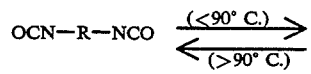

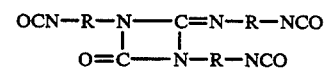

where R = 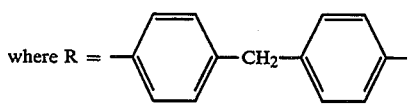

The Type 2 copolyester diol is described in U.S. patent application Ser. No. 336,001, filed Apr. 10, 1989, and reference is made to the discussion therein of the Type 2 hydroxyl-terminated, linear, saturated copolyesters. An illustrative (and non-limiting) saturated copolyester diol is the "Dynacoll" RP 200 series of hydroxyl-terminated polyesters (produced by Huls-America).

As described previously, the Type 4 diols incorporated in forming the polyurethane base resins of the present invention are ring-opened polymers of cyclic esters. These homopolyester polyols provide properties of improved adhesion with good green strength, ease in processing and better hydrolytic stability. Illustrative (and non-limiting) Type 4 diols are the Tone Polyol 0200 series (made by Union Carbide Chemicals and Plastics Company, Inc.). The Tone Polyol 0200 series are polycaprolactone diols having a molecular weight of 530–3000. These diols have a melting point of 30°–60° C. and a density of 1.08 g/cm$^3$ at 100° F., and are a white solid. Typical properties of the Tone 0200 polyols are shown in the following Table 3:

Of course, and as discussed previously, the polyurethane base resin according to the present invention can be cured by exposure to moisture.

The polyurethane adhesive composition is provided upon curing of the polyurethane adhesive composite (or base resin) according to the present invention.

The adhesive composition of the present invention can include additives such as stabilizers, fillers, pigments, thixotropes, plasticizers, adhesion promoters, catalysts, reinforcements, antioxidants, flame retardants, curing agents, crosslinking agents and/or solvents, as desired. Such modifying additives are known in the art. Such modifying additives can be, e.g., added to the polyurethane base resin, as described in U.S. patent application Ser. No. 336,001.

In the following Example, a comparison is made between material "A" (which is a material according to U.S. patent application Ser. No. 336,001), and material "B" (which is a material according to the present invention). In the following Example, the "Isonate" 125M diisocyanate (manufactured by The Dow Chemical Co.) is a "pure" MDI of 100% diphenylmethane diisocyanate containing 4, 4'-diphenylmethane diisocyanate at 98%. Moreover, the Type 1 diol and Type 3 diol respectively are "Dynacoll" RP110 (manufactured by Huls America) and "Dynacoll" RP360 (manufactured by Huls America), the former being a solid, amorphous

|  | Average Molecular Weight | Hydroxyl Number, mg. KOH/g | Melting Point Range, °C. | Viscosity, Centistokes 85° C. | Specific Gravity, 44/20° C. |
| --- | --- | --- | --- | --- | --- |
| TONE 0200 Polyol | 530 | 212 | 30–40 | 88 | 1.073 |
| TONE 0210 Polyol | 830 | 135 | 35–45 | 167 | 1.072 |
| TONE 0230 Polyol | 1250 | 90 | 40–50 | 284 | 1.071 |
| TONE 0240 Polyol | 2000 | 56.1 | 45–55 | 635 | 1.071 |
| TONE 0250 Polyol | 3000 | 37.4 | 50–60 | 1490 | 1.070 |

A catalyst (for example, an organometallic catalyst such as an organotin catalyst) may also be present during synthesis of the polyurethane base resin from the polyols and diisocyanate. The catalyst accelerates the synthesis, and may improve the cure rate of the adhesive composition. Tertiary amine catalysts may provide similar effects. Reference is made to the catalysts disclosed in U.S. patent application Ser. No. 336,001, for synthesis of the polyurethnane base resin therein; such catalysts can also be utilized in the present invention, in amounts as disclosed in U.S. patent application Ser. No. 336,001.

A specific illustrative organotin catalyst which can be utilized as discussed above is DABCO® T-9 catalyst (manufactured by Air Products and Chemicals, Inc.), which is a stannous type catalyst having a total tin content of 28.0%; a percent stannous of total tin of 97%; a viscosity (Brookfield (25° C.)) of 250 cs or 312 cps; a flash point of 142° C. and a specific gravity (25° C.) of 1.25, the catalyst being a clear liquid.

As mentioned previously, various typical curing agents can be admixed with the polyurethane base resin in forming the polyurethane composite according to the present invention. Reference is made to the curing agents, including the amine-terminated solid polyamide resins, as disclosed in U.S. patent application Ser. No 336,001; such curing agents can be used in the present invention.

copolyester diol with glass transition temperatures above 0° C. and with flow points about 50° C., and the latter being a solid, partially crystalline copolyester diol with glass transition temperature below 0° C. and flow points above 60° C.

EXAMPLE

The following materials (A and B) were prepared by first melting and blending the diols, then combining with the isocyanate. An organotin catalyst was then added. The materials were reacted at temperatures between approximately 80° and 100° C. for 30–60 minutes, then degassed and discharged into air-tight containers.

|  | A | | B | |
| --- | --- | --- | --- | --- |
|  | % by wt. | eq. ratios | % by wt. | eq. ratio |
| Isonate 125M Dow Chemical Corp. (MDI) | 13.62 | 16 |  |  |
| Isonate 143L Dow Chemical Corp. (Mod. MDI) |  |  | 15.88 | 10 |
| Dynacoll RP1100 Huls America (Type 1 diol) | 12.45 | 2 |  |  |
| Dynacoll RP230 Huls America (Type 2 diol) | 24.10 | 2 | 39.84 | 4 |
| Dynacoll RP360 Huls America (Type 3 diol) | 49.82 | 4 |  |  |
| Tone 0240 |  |  | 44.27 | 2 |

-continued

| | A | | B | |
|---|---|---|---|---|
| | % by wt. | eq. ratios | % by wt. | eq. ratio |
| Union Carbide (Type 4 diol) | | | | |
| Dabco T-9 | 0.01 | | 0.01 | |
| Air Products (organotin catalyst) | | | | |
| | 100.00 | | 100.00 | |

The polyurethane base resins A and B had the following properties:

| | A (Ser. No. 336,001 filed April 10, 1989) | B (Present Invention) |
|---|---|---|
| Composition: | MDI + Type 1, 2 & 3 Diols | Mod. MDI + Type 2 & 4 Diols |
| % NCO | 2.31 | 1.82 |
| Functionality | 2.0 | 2.0 @ >90° C., ≧3.0 @ 90° C. |
| Viscosity at 100° C. (cP) | 18,500 | 46,300 |

Thereafter, each of the polyurethane base resins A and B was exposed to atmospheric moisture for curing, to form thermosetting polyurethane adhesive compositions A' and B',, respectively, which had the following physical properties:

| Physical Properties after Exposure to Atmospheric Moisture | | |
|---|---|---|
| | A' | B' |
| Ultimate Tensile Strength (psi) | | |
| 7 Days at R.T. (room temp.) | 1553 | 1764 |
| 7 Days at R.T. Tested at 150° F. (66° C.)$_{(1)}$ | 64 | 567 |
| Acrylic Tongue to ABS Groove Tensile Adhesion (psi) | | |
| 7 Days at R.T. | 412 | 691 |
| 7 Days at R.T. Tested at 150° F. (66° C.)$_{(1)}$ | 101 | 185 |
| 7 Days at R.T. Tested at 180° F. (82° C.)$_{(2)}$ | — | 115 |

$_{(1)}$equilibrated for 10 minutes prior to testing.
$_{(2)}$equilibrated for 30 minutes prior to testing.

As can be seen in the foregoing chart of physical properties, the adhesive composition according to the present invention had improved ultimate tensile strength and adhesion, as compared with polyurethane base resins containing Type 1–3 diols and MDI, particularly at elevated temperatures (above room temperature).

Accordingly, through the present invention, the objectives of isocyanate-functional materials that are liquids or thermoplastic solids, yet which are ultimately thermosetting by reaction with moisture or any typical curing agent, and which have improved properties when subjected to elevated service temperatures can be achieved.

Other embodiments of the invention will be apparent to those skilled in the art from consideration of the specification and practice of the invention expressly disclosed herein and/or incorporated herein by reference. It is intended that the specification and examples be considered as exemplary only, with a true scope and spirit of the invention being indicated by the following claims.

What is claimed is:

1. A polyurethane base resin for systems used at elevated service temperatures formed by reacting polyisocyanates with polyol compounds, wherein the polyisocyanates consist of polycarbodiimide-modified 4, 4'-diphenylmethane diisocyanate, and wherein the polyol compounds consist of (a) a hydroxyl-terminated, linear, saturated, liquid copolyester diol having a glass transition temperature of at most −10° C. and of at least −60° C., and (b) a homopolyester polyol that is a ring-opened polymer of a cyclic ester.

2. The polyurethane base resin of claim 1, wherein the homopolyester polyol is polycaprolactone.

3. The polyurethane base resin of claim 1, wherein the polycarbodiimide-modified 4, 4'-diphenylmethane diisocyanate is 4, 4'-diphenylmethane diisocyanate and a tri-functional (with respect to available isocyanate groups per molecule) carbodiimide-containing adduct of 4, 4'-diphenylmethane diisocyanate.

4. The polyurethane base resin of claim 3, wherein the polycarbodiimide-modified 4, 4'-diphenylmethane diisocyanate is, in % w/w, 70–80% of 4, 4'-diphenylmethane diisocyanate and 20–30% of the tri-functional (with respect to available isocyanate groups per molecule) carbodiimide-containing adduct of 4, 4'-diphenylmethane diisocyanate.

5. The polyurethane base resin of claim 1, wherein the polyisocyanates and the polyol compounds form a reaction mixture, and wherein, in equivalent ratios of reactants, the polycarbodiimide-modified 4, 4'-diphenylmethane diisocyanate is included in the reaction mixture in the range of 4–16, the hydroxyl-terminated, linear, saturated, liquid polyester diol is included in the reaction mixture in the range of 0–8, the lower end point being excluded, and the homopolyester polyol is included in the reaction mixture in the range of 0–4, the lower end point being excluded and the NCO/OH ratio is greater than one.

6. The polyurethane base resin of claim 5, wherein the polycarbodiimide-modified 4, 4'-diphenylmethane diisocyanate is included in the reaction mixture in the range of 8–12, the hydroxyl-terminated, linear, saturated liquid polyester diol is included in the reaction mixture in the range of 2–6, and the homopolyester polyol is included in the reaction mixture in the range of 1–3 and the NCO/OH range is greater than one.

7. A polyurethane composite comprising the polyurethane base resin of claim 1 and a curing agent for curing the polyurethane base resin.

8. The polyurethane composite of claim 7, wherein the composite is thermosetting.

9. The polyurethane base resin of claim 1, wherein in the polyurethane base resin has been cured by exposure to moisture.

* * * * *